US005333735A

United States Patent [19]

Focke et al.

[11] Patent Number: 5,333,735
[45] Date of Patent: Aug. 2, 1994

[54] SOFT PACK, ESPECIALLY CUBOID PAPER TISSUE PACK

[75] Inventors: Heinz Focke, Verden; Harald Gosebruch, Hanover, both of Fed. Rep. of Germany

[73] Assignee: Focke & Co. (GmbH & Co.), Verden, Fed. Rep. of Germany

[21] Appl. No.: 903,735

[22] Filed: Jun. 24, 1992

[30] Foreign Application Priority Data

Jun. 27, 1991 [DE] Fed. Rep. of Germany ....... 4121217
Oct. 19, 1991 [DE] Fed. Rep. of Germany ....... 4134567

[51] Int. Cl.5 ............................................. B65D 65/28
[52] U.S. Cl. ................................. 206/494; 229/87.05; 229/160.2; 229/238
[58] Field of Search .................. 229/87.05, 160.2, 203, 229/238, 264, 206, 237; 383/203, 205, 207, 200, 903; 206/494, 264

[56] References Cited

U.S. PATENT DOCUMENTS

| 2,913,165 | 12/1956 | Jacke . | |
| 3,613,874 | 10/1971 | Miller | 383/86 X |
| 3,987,959 | 10/1976 | Deards et al. | 383/903 X |
| 4,460,088 | 7/1984 | Rugenstein et al. | 206/264 X |
| 4,552,269 | 11/1985 | Chang . | |
| 4,651,874 | 3/1987 | Nakamura | 383/205 X |
| 4,982,845 | 1/1991 | Prascak et al. | 229/87.05 |
| 5,029,712 | 7/1991 | O'Brien et al. . | |
| 5,065,868 | 11/1991 | Cornelissen et al. | 206/494 |
| 5,096,113 | 3/1992 | Focke | 229/87.05 |

FOREIGN PATENT DOCUMENTS

| 0682604 | 12/1966 | Belgium | 383/207 |
| 221168 | 10/1988 | European Pat. Off. . | |
| 392224 | 10/1990 | European Pat. Off. . | |
| 8708274 | 9/1987 | Fed. Rep. of Germany . | |
| 3621813 | 1/1988 | Fed. Rep. of Germany . | |
| 3700988 | 7/1988 | Fed. Rep. of Germany . | |
| 3839180 | 1/1990 | Fed. Rep. of Germany . | |
| 3920065 | 10/1990 | Fed. Rep. of Germany . | |
| 3911972 | 2/1991 | Fed. Rep. of Germany . | |
| 9103403 | 3/1991 | PCT Int'l Appl. | 383/903 |

Primary Examiner—Allan N. Shoap
Assistant Examiner—Jes F. Pascua
Attorney, Agent, or Firm—Sughrue, Mion, Zinn, Macpeak & Seas

[57] ABSTRACT

Soft packs for paper tissues are usually made of a thin foil. A tear-open flap is formed from weakening lines and can be torn with an attached adhesive tape (22) in order to open the pack. To avoid a further accidental tearing of the pack, reinforcements which locally increase the tearing resistance of the wrapper are arranged in the region of weakening line ends (21).

20 Claims, 8 Drawing Sheets

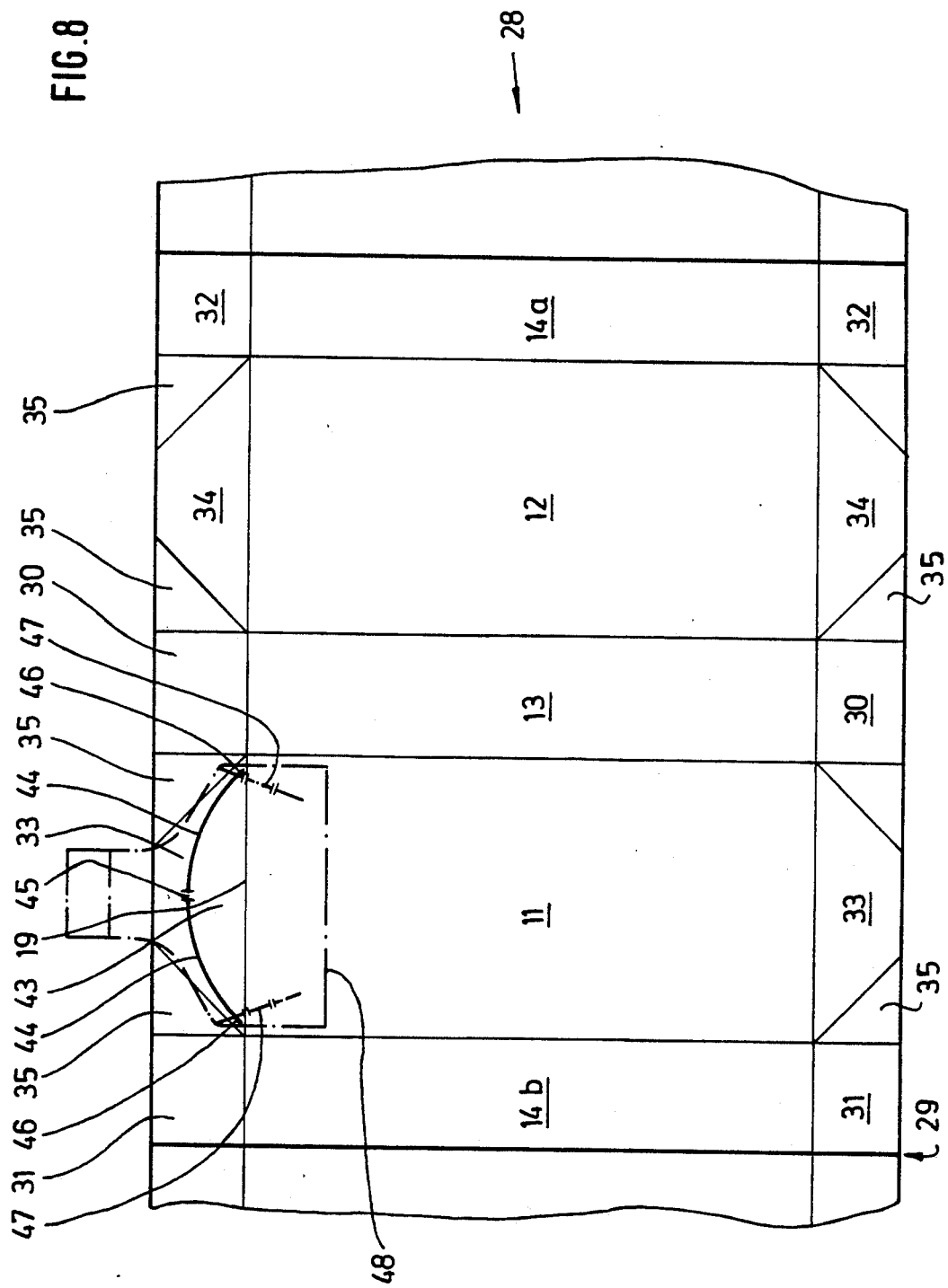

SOFT PACK, ESPECIALLY CUBOID PAPER TISSUE PACK

BACKGROUND OF THE INVENTION

The invention relates to a soft pack, especially a cuboid paper tissue pack comprising an outer wrapper made of foil, paper, paper-like materials or the like, which pack has a tear-open flap which is at least partially delimited by weakening lines, punch cuts or perforations and which can be moved into an open and a closed position by means of an adhesive tape.

Reclosable packs for a plurality of articles which are removed at different times are for example provided with a tear-open flap which is reclosable by means of an adhesive tape or adhesive strip. EP-A-0 393 395 discloses a foil pack which is particularly suitable for paper tissues and in which, for the first extraction of a tissue, the foil can be partially opened via a tear-open flap and can subsequently be reclosed by means of an adhesive tape. The tear-open flap is formed in the foil by means of weakening lines, perforations or the like.

To save costs and protect the environment, the pack should be made as light and as thin as possible. Especially in the case of easily torn material, there is a danger that the pack tears too far when the tear-open flap is used.

SUMMARY OF THE INVENTION

The present invention has the object to prevent or at least to render more difficult an opening of the pack beyond the predetermined bounds. The opening which is formed as a result of the tearing process must be reliably defined.

According to the invention, this object is attained by transversely directed reinforcements which locally increase the tearing resistance of the wrapper and which are disposed at free ends of the weakening lines or such that they delimit tearing lines which follow the weakening line ends. The reinforcements prevent a tearing of the pack beyond the desired bounds.

Expediently, the reinforcements are in the form of foils, especially tear-resistant foils, which are glued or sealed on the outer wrapper. In another embodiment, the local reinforcements are formed from coatings, especially of a hot-melt material, which are applied in a deformable state and then harden.

It is particularly advantageous, if the adhesive tape, as a o result of appropriate dimensions and an appropriate geometric design and arrangement, additionally forms the reinforcement. For this purpose, the adhesive tape extends into the region of the free ends of the weakening lines. This type of double-function of the adhesive tape dispenses with additional measures for forming the reinforcements. The pack is particularly cheap and no more complicated to manufacture than packs without reinforcements.

In another embodiment of the invention, the object is attained as a result of the adhesive tape being provided with weakening lines, perforations or punch cuts which at least adjoin the weakening lines of the tear-open flap or intersect these lines, and which extend approximately in the tear-open direction or at a small angle thereto and end at a distance from an outer edge of the adhesive tape. It is sufficient to define tearing lines by means of weakening lines in the adhesive tape, especially when the outer wrapper is made of an easily tearable material. As a result of the tearing lines which form, the tear-open flap which is created is greater than the weakening lines disposed in the outer wrapper would suggest.

BRIEF DESCRIPTION OF THE DRAWINGS

Further relevant features of the invention are recited in the dependent claims. Particularly advantageous embodiments of the invention will be described below in detail with reference to the drawings, in which:

FIG. 8 shows a blank for a pack according to FIGS. 6 and 7.

DETAILED DESCRIPTION OF THE PREFERRED EMBODIMENTS

Figure 1:
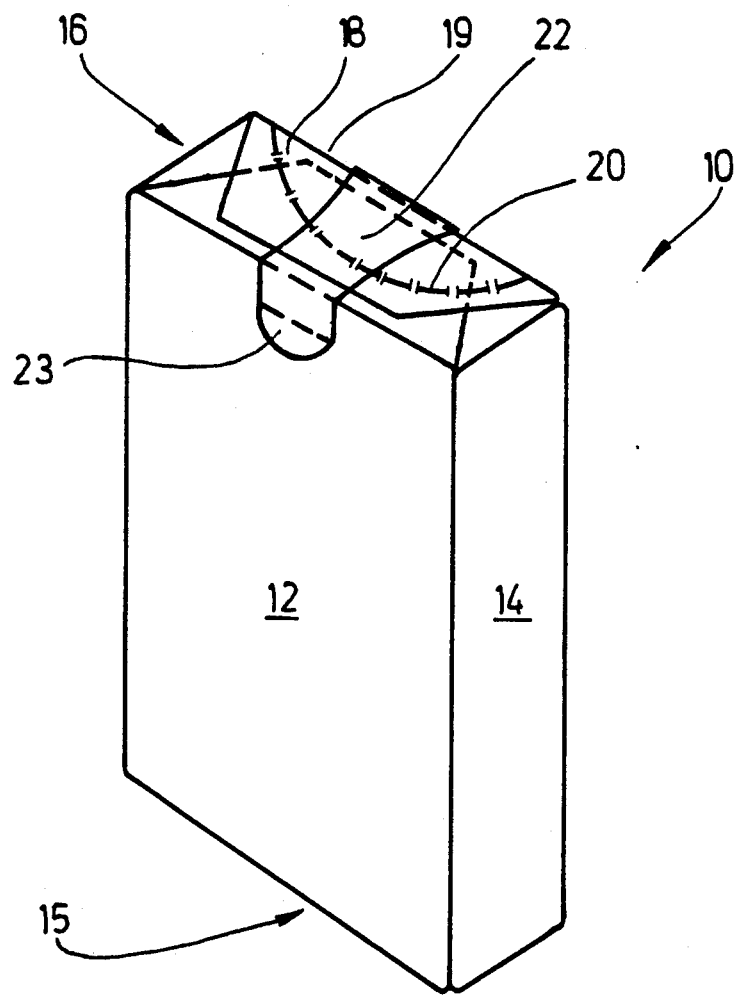
FIG. 1 is a perspective view of a closed pack according to the invention.

An exemplary embodiment relates to a soft cuboid pack 10 (FIGS. 1 and 2) for paper tissues which forms an outer wrapper. This pack comprise s a front panel 11, a rear panel 12, side panels 13, 14, a bottom panel 15 and an end (top) panel 16. The material is selected to be a thin foil made of plastic, paper, parchment paper or glassine. For the extraction of the paper tissues 17, a tear-or en flap 18 is provided in the region of the front panel 11 and the end panel 16. This flap extends across a transverse edge 19 which joins the end panel 16 and the front panel 11 and only occupies portions of the end panel 16 and front panel 11. The tear-open flap 18 is formed from weakening lines 20 which may be in the form of perforations, punch lines or the like. In the region of the front panel 11, there is a gap between the weakening lines 20, so that the tear-open flap 18 can be torn from the end panel 16 to the front panel 11 up to oppositely situated weakening line ends 21 in the top 30 part of the front panel 11.

Figure 2:
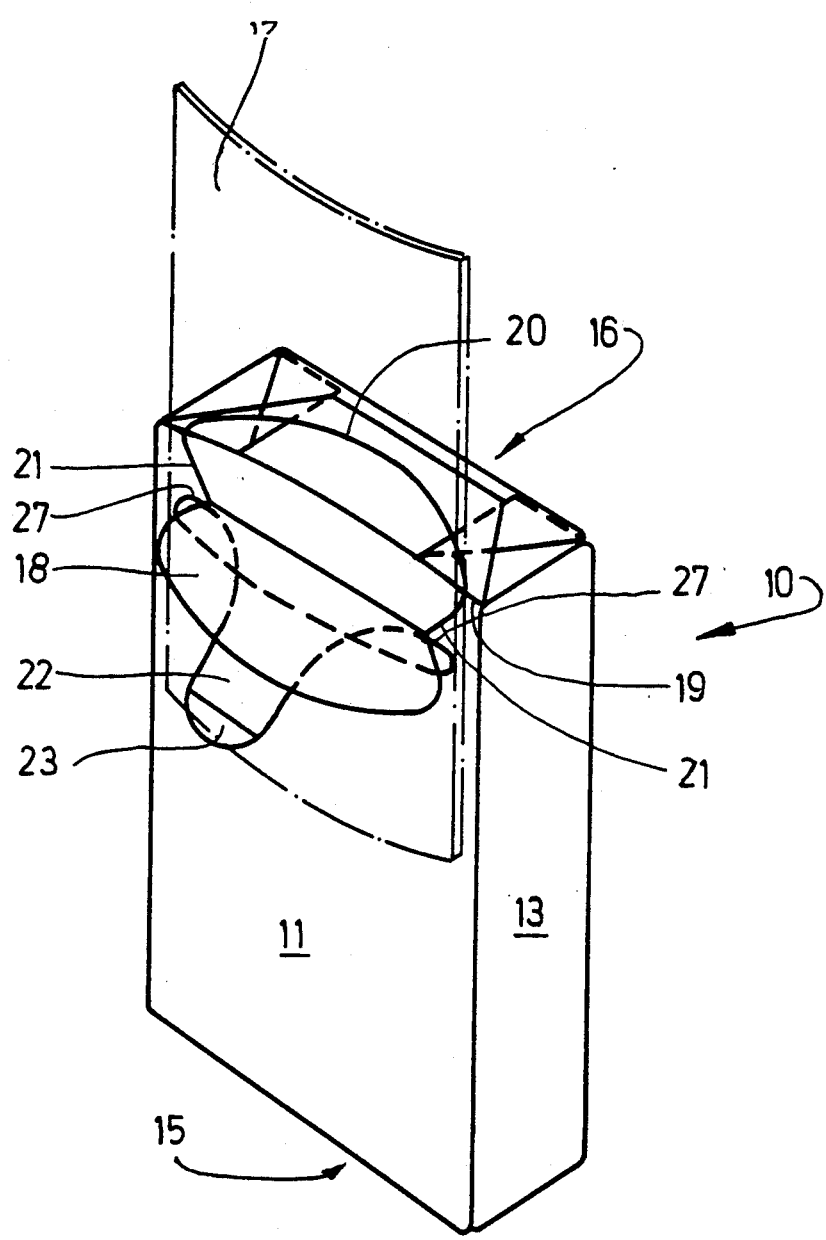
FIG. 2 is a perspective view of an opened pack which is rotated by 180° about its longitudinal axis compared to FIG. 1.
Figure 3:
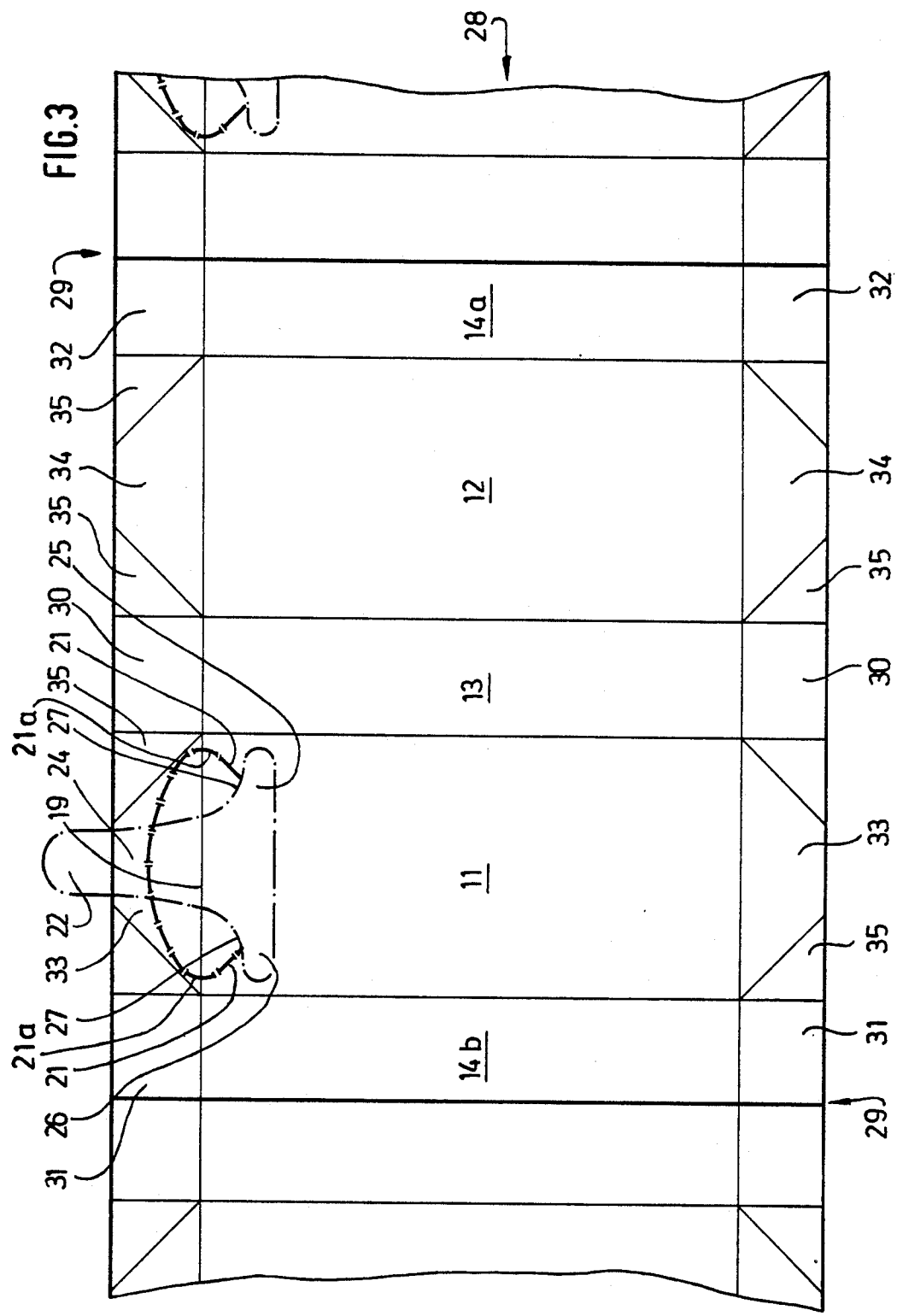
FIG. 3 shows a blank for a pack according to FIGS. 1 and 2.

To form the tear-open flap 18, the weakening lines 20 extend approximately in the shape of an arc of a circle with an almost constant radius (FIGS. 2 and 3). At the points of transition to the front panel 11, the weakening lines 20 have shorter radii 21a so that from these points the weakening line ends 21 converge towards one another in the direction of the bottom panel 15. The curve which is altogether formed from the weakening lines 20 is thus open towards the bottom panel 15 in the region of the front panel 11.

To facilitate the tearing process, a tear-resistant adhesive tape 22 is applied to the tear-open flap 18. When the pack 10 is closed, this tape rests loosely on the rear panel 12 with one end 23 and extends from this end across the end panel 16 to the front panel 11. The adhesive tape 22 is connected to the pack 10 with a great adhesive strength, but is nevertheless releasable. A pull on the adhesive tape 22 moves the tear-open flap 18 and tears the pack 10 along the weakening lines 20.

To avoid a tearing beyond the weakening line ends 21, the adhesive tape 22 is designed and arranged in a special way. Particularly FIG. 3 illustrates the T-shape of the adhesive tape 22 which comprises a long leg 24 and two short side legs 25, 26. The short side legs 25, 26 are attached to the pack 10 below the weakening line ends 21 and at the same time delimit these weakening line ends 21. The transition between the long leg 24 and each of the short side legs 25, 26 is designed to be curved, so that each of the weakening line ends 21 is delimited by the inner contour of a curve 27 which is formed in this manner. FIG. 2 shows the open position of the pack 10 with a partially extracted paper tissue 17 and illustrates that the tear-open flap can only be opened up to a precisely defined part, particularly to the point where the weakening line ends 21 meet the inner contour of the curve 27 on the adhesive tape 22. To facilitate the initial tearing of the pack, the weakening line 20 underneath the adhesive tape 22 may be in the form of a severing cut.

FIG. 3 shows the pack in the form of a spread-out blank being part of a continuous blank web 28. The individual blanks are severed from the web along the bold solid line 29. Each individual blank is divided into front panel 11, rear panel 12 and side panel 13. The side panel 14 is formed from overlapping side panels 14a, 14b. Side tabs 30, 31, 32 adjoin the side panels at the top and bottom and longitudinal tabs 33, 34 adjoin the front panel 11 and rear panel 12, respectively.

To form the bottom panel 15 and end panel 16, the side tabs 30, 31 (32) are first of all folded inwardly and then the longitudinal tab 34 of the rear panel 12 and finally the longitudinal tab 33 of the front panel 11 are folded. Since the side tabs and longitudinal tabs are not separated from one another by cuts, this folding forms gussets 35 in the region of each of the longitudinal tabs 33, 34. The weakening lines 20 are arranged in such a way that they extend in a curved manner in the region of the longitudinal tab 33 which forms the end panel 16 outside the gussets 35. Similarly, the adhesive tape 22 extends between the gussets 35 and projects beyond the top of the longitudinal tab 33.

Figure 4:
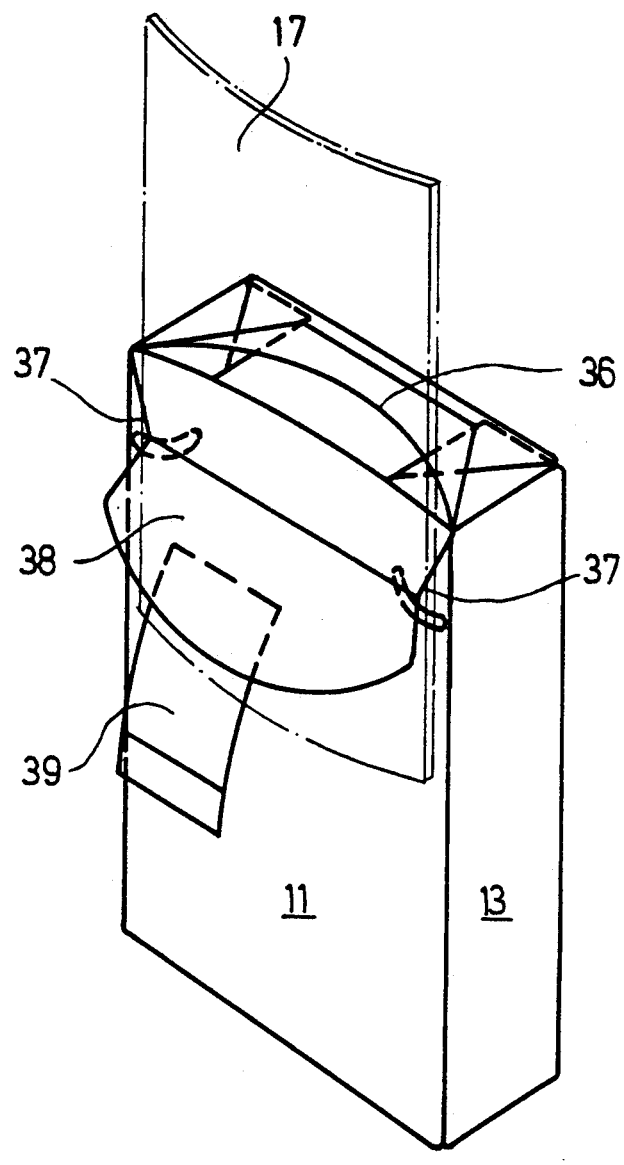
FIG. 4 shows another embodiment of a pack according to the invention, in a perspective view which is similar to FIG. 2.
Figure 5:
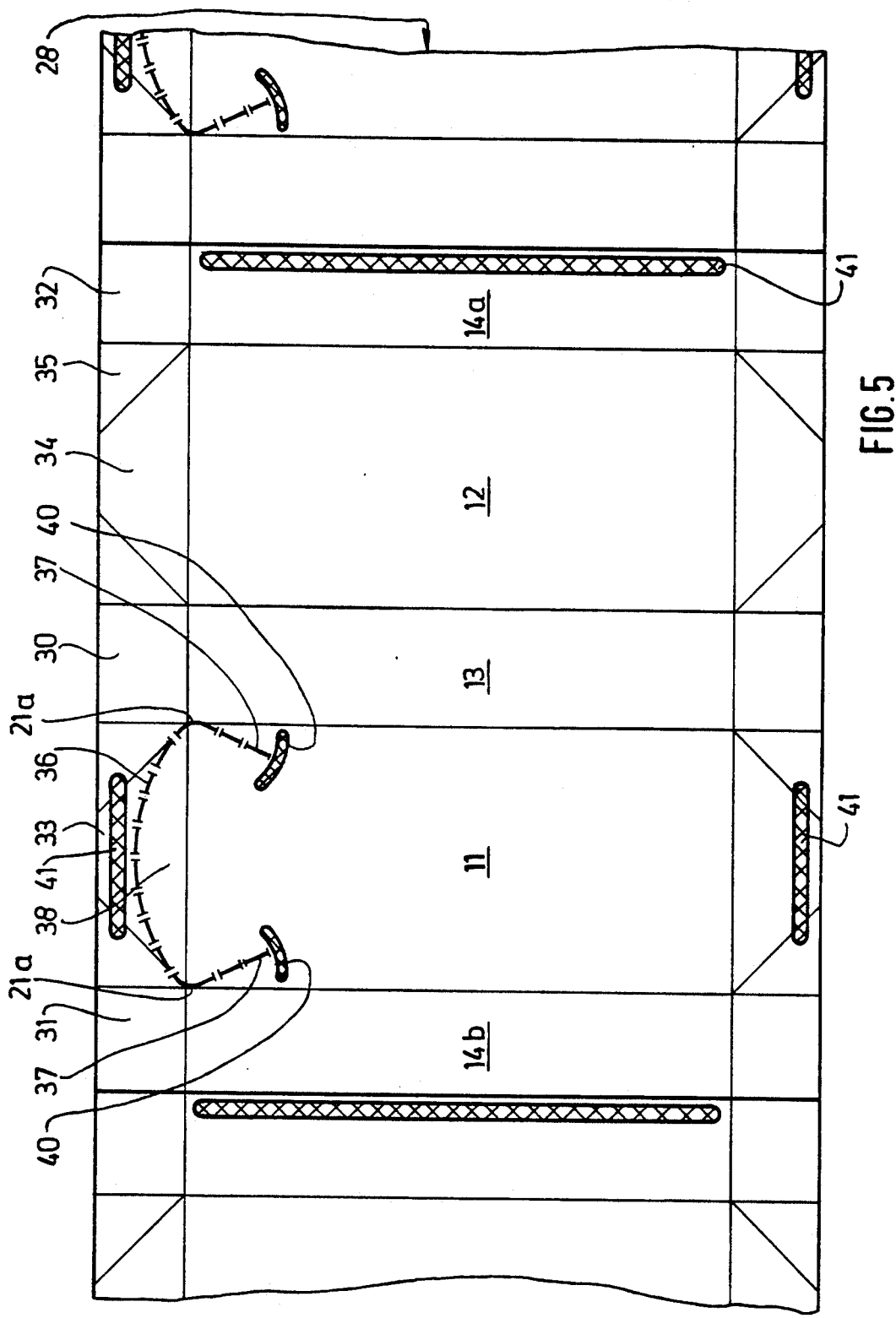
FIG. 5 shows a blank for a pack according to FIG. 4.

FIGS. 4 and 5 relate to another embodiment of a pack according to the invention. The division of the blank into front panel, rear panel, side panels, bottom panel and end panel as well as side and longitudinal tabs corresponds to FIGS. 1 to 3. The embodiments are different with regard to the arrangement of the weakening lines 36. In contrast to the weakening lines 20 of FIGS. 1 to 3, these weakening lines 36 extend over the entire width of the front panel 11. The curved contour in the region of the longitudinal tab 33 and the following transitions into weakening line ends 37 in the region of the front panel 11 are the same. Such a tear-open flap 38 is also provided with an adhesive tape 39.

In the region of the weakening line ends 37, the front panel 11 is provided with coatings 40 which have a curved shape, so that each weakening line end 37 terminates at an inner contour of a coating. The coatings 40 are preferably made of a material which can be melted under heat and hardens, which is also called a hot-melt material, and are more resistant to tearing than the rest of the pack. Accordingly, this embodiment also effectively prevents a tearing of the tearing flap 38 beyond the weakening line ends 37.

This type of hot-melt coating may also be provided in the region of the longitudinal tabs 33 and the side panels 14a to form an adhesive connection for the folded pack. The coatings in these areas are designated with the reference numeral 41. These type of adhesive connections or similar connections for forming a dimensionally stable pack 10 are not illustrated in FIGS. 1 to 3, but they nevertheless exist.

The embodiments which have been described in the foregoing may also be modified such that the reinforcements 25, 26 or 40 which locally increase the tearing resistance of the wrapper are arranged to be spaced from the weakening line ends 21, 37. When the tear-open flap 18, 38 is opened, tearing lines form in the wrapper. These tearing lines extend the weakening line ends 21, 37 and are delimited by the reinforcements 25, 26, 40.

Figure 6:
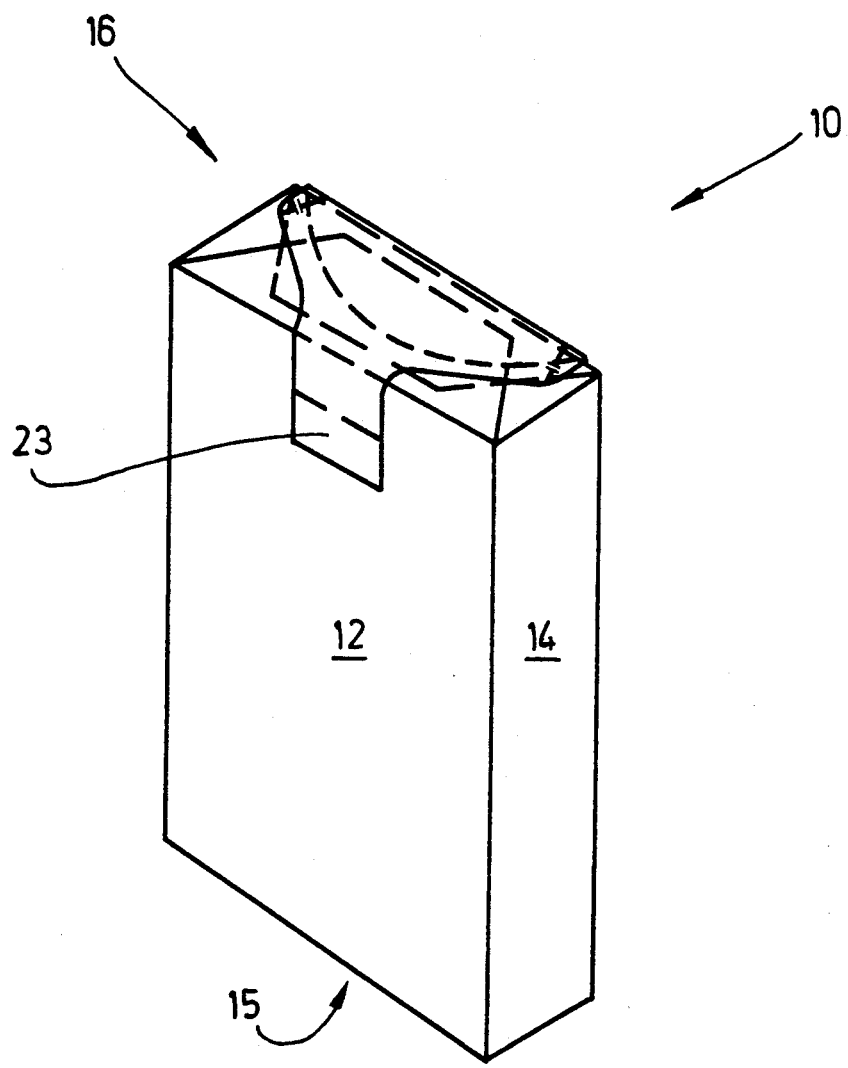
FIG. 6 is a perspective view of another embodiment of pack according to the invention, similar to FIG. 1.
Figure 7:
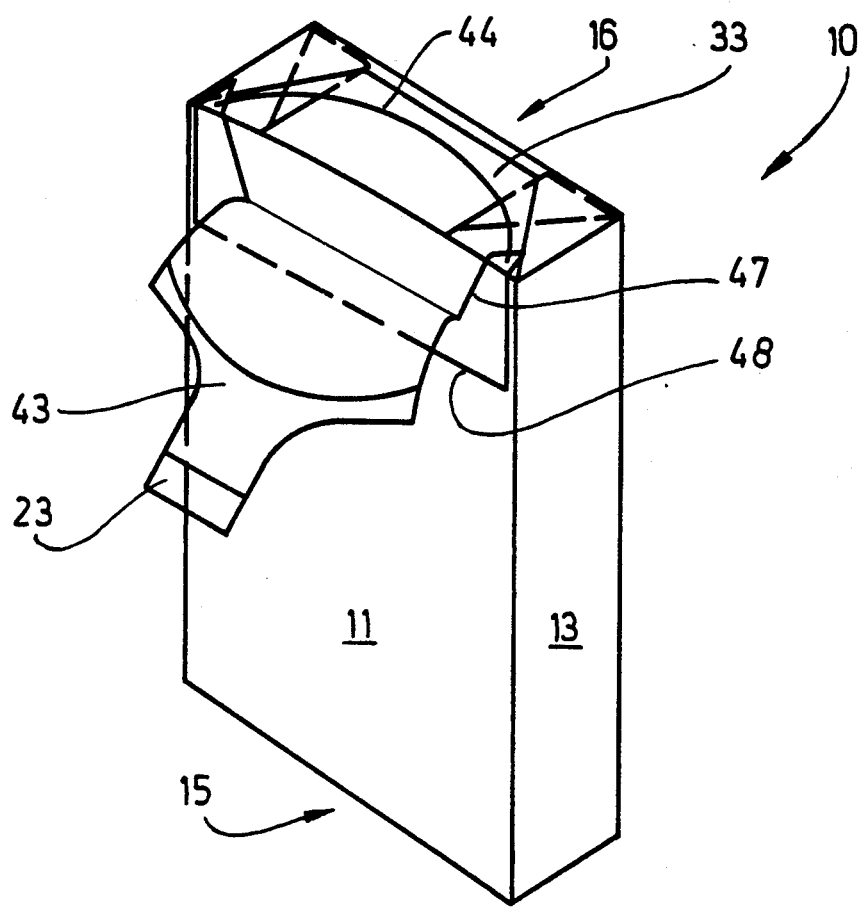
FIG. 7 is a perspective view of an opened pack which is rotated by 180° about its longitudinal axis compared to FIG. 6.

A further embodiment of the invention is illustrated in FIGS. 6, 7 and 8. The different representations in the Figures are analogous to FIGS. 1 to 3. Wherever possible, the same reference numerals have been used. The design of a tear-open flap 42 and of an adhesive tape 43 which is connected therewith is slightly different. These parts are described in detail in the following.

The tear-open flap 42 is formed from weakening lines, perforations or punch cuts 44 which are separated from one another by a residual connection 45. This ensures that the tear-open flap 42 does not already open when the pack is folded together. The weakening lines 44 are arranged in the region of the longitudinal tab 33 which forms the end panel 16 and form a curve which is open towards the front panel 11. Weakening line ends 46 are located in the region of the top edge 19 of the front panel 11 and of the gussets 35.

The adhesive tape 43 covers the tear-open flap 42, preferably the whole of the flap. The adhesive tape 43 comprises weakening lines 47, perforations or punch cuts which at least adjoin the weakening lines 44 of the tear-open flap 42 or intersect them. The adhesive tape 43 is arranged on the wrapper in an appropriate manner. In the present exemplary embodiment, the weakening lines 47 intersect the weakening line ends 46 and at the same time extend in the tear-open direction. When the pack 10 is opened, it tears in the region of the front panel 11, starting from the weakening line ends 46, precisely underneath the weakening lines 47. The weakening lines 47 may also extend at a small angle relative to the tearing direction, up to a maximum of less than 90°. The tearing lines which are formed in this way in the pack 10 underneath the weakening lines 47 end together with these weakening lines, particularly at a distance from an outer edge 48 of the adhesive tape 43. The weakening lines 47 extend in a converging manner from the top edge 19 towards the bottom panel 15. The same applies to the weakening line ends 21, 37 of the embodiments of FIGS. 1 to 5.

We claim:
1. A cuboid paper tissue soft pack with an outer wrapper, wherein the outer wrapper has a narrow end panel (16) and a corresponding bottom panel (15), a wide front panel (11) adjacent the end panel (16), and a corresponding rear panel (12), and side panels (13, 14); said pack comprising:
   a tear-open flap (18, 38, 42) which is defined in the outer wrapper by first weakening lines (20, 36), and which is formed in a region of the narrow end panel (16) and extends therefrom up to the adjacent front panel (11);
   an adhesive strip (22, 39), which is disposed on the outer wrapper, which at least partially covers the tear-open flap and the weakening lines, which par- tially projects beyond the tear-open flap, and by means of which the tear-open flap is movable between an open and a closed position, the adhesives strip and the tear-open flap being connected to one another, wherein the weakening lines (20, 36) have opposite end regions which are not covered by the adhesive strip; and reinforcement means (25, 26, 40), which are respectively located in said front panel (11) adjacent opposite free ends (21, 37) of said end regions of the weakening lines, for forming local reinforcements which locally increase the tearing resistance of the wrapper.

2. The pack as claimed in claim 1, wherein the reinforcement means are tear-resistant foils that are bonded to the wrapper.

3. The pack as claimed in claim 1, wherein the adhesive strip (22) has dimensions and a geometric design and arrangement such that the adhesive tape extends to the free ends (21) of the weakening lines (22) and forms the tear-resistant reinforcement when the tear-open flap (1) is opened.

4. The pack as claimed in claim 1, wherein said free ends are delimited by the adhesive strip (22).

5. The pack as claimed in claim 1, wherein the adhesive strip (22) has a T-shaped design and extends with a long leg (24) beyond the weakening lines (20) of the tear-open flap (18).

6. The pack as claimed in claim 5, wherein the weakening lines (20) are delimited by the adhesive strip (22) in a curved transition region (27) between short side legs (25, 26) and the long leg (24).

7. The pack as claimed in claim 1, wherein the local reinforcements are in the form of coatings (40) which are made of hot-melt material, and which are applied in a deformable state and then harden.

8. The pack as claimed in claim 1, wherein the reinforcements have a curved shape and are arranged transverse to the end regions (37) of the weakening lines (36) and delimit said weakening lines (36).

9. The pack as claimed in claim 1, wherein said local reinforcements (25, 26, 40) are formed by edges of the adhesive strip (22, 39, 43) that are adjacent the free ends (21, 37) of the weakening lines (20, 36, 44).

10. The pack as claimed in claim 1, characterized in that the adhesive strip has second weakening lines which at least adjoin the first weakening lines delimiting the tear-open flap, and which extend approximately in the tear-open direction and end at a distance from an outer edge of the adhesive strip.

11. The pack as claimed in claim 10, wherein the weakening lines (47) are formed in the adhesive strip (43) at least in a region of the wider front panel (11) which adjoins the end panel (16).

12. The pack as claimed in claim 10, wherein the tear-open flap (42) is formed from two adjoining curved cuts (44), and wherein a residual connection (45) is left between said curved cuts (44) to prevent an accidental lifting of the tear-open flap.

13. The pack as claimed in claim 10, wherein the adhesive strip (43) completely covers the tear-open flap (42).

14. A cuboid paper tissue soft pack with an outer wrapper, comprising:

a tear-open flap (18, 38, 42) which is defined in the outer wrapper by first weakening lines (20, 36, 44);

an adhesive strip (22, 39, 43) which is disposed on the outer wrapper, which at least partially covers the tear-open flap and the weakening lines, which partially projects beyond the tear-open flap, and by means of which the tear-open flap is movable between an open and a closed position, the adhesive strip and the tear-open flap being connected to one another, wherein the weakening lines (20, 36, 44) have opposite end regions which are not covered by the adhesive strip; and reinforcement means (25, 26, 40), which are respectively located adjacent opposite free ends (21, 37) of said end regions of the weakening lines, for forming local reinforcements which locally increase the tearing resistance of the wrapper;

wherein the reinforcement means are tear-resistant foils that are bonded to the wrapper.

15. A cuboid paper tissue soft pack with an outer wrapper, comprising:

a tear-open flap (18, 38, 42) which is defined in the outer wrapper by first weakening lines (20, 36, 44);

an adhesive strip (22, 39, 43) which is disposed on the outer wrapper, which at least partially covers the tear-open flap and the weakening lines, which partially projects beyond the tear-open flap, and by means of which the tear-open flap is movable between an open and a closed position, the adhesive strip and the tear-open flap being connected to one another, wherein the weakening lines (20, 36, 44) have opposite end regions which are not covered by the adhesive strip; and reinforcement means (25, 26, 40), which are respectively located adjacent opposite free ends (21, 37) of said end regions of the weakening lines, for forming local reinforcements which locally increase the tearing resistance of the wrapper;

wherein the adhesive strip (22) has dimensions and a geometric design and arrangement such that the adhesive strip extends to the free ends (21) of the weakening lines (22) and forms a tear-resistant reinforcement when the tear-open flap (18) is opened.

16. A cuboid paper tissue soft pack with an outer wrapper, comprising:

a tear-open flap (18, 38, 42) which is defined in the outer wrapper by first weakening lines (20, 36, 44);

an adhesive strip (22, 39, 43) which is disposed on the outer wrapper, which at least partially covers the tear-open flap and the weakening lines, which partially projects beyond the tear-open flap, and by means of which the tear-open flap is movable between an open and a closed position, the adhesive strip and the tear-open flap being connected to one another, wherein the weakening lines (20, 36, 44) have opposite ends regions which are not covered by the adhesive strip; and reinforcement means (25, 26, 40), which are respectively located adjacent opposite free ends (21, 37) of said end regions of the weakening lines, for forming local reinforcements which locally increase the tearing resistance of the wrapper;

wherein said free ends are delimited by the adhesive strip (22).

17. A cuboid paper tissue soft pack with an outer wrapper, comprising:

a tear-open flap (18, 38, 42) which is defined in the outer wrapper by first weakening lines (20, 36, 44);

an adhesive strip (22, 39, 43) which is disposed on the outer wrapper, which at least partially covers the tear-open flap and the weakening lines, which partially projects beyond the tear-open flap, and by means of which the tear-open flap is movable between an open and a closed position, the adhesive strip and the tear-open flap being connected to one another, wherein the weakening lines (20, 36, 44) have opposite ends regions which are not covered by the adhesive strip; and reinforcement means (25, 26, 40), which are respectively located adjacent opposite free ends (21, 37) of said end regions of the weakening lines, for forming local reinforcements which locally increase the tearing resistance of the wrapper;

wherein the adhesive strip (22) has a T-shaped design and extends with a long leg (24) beyond the weakening lines (20) of the tear-open flat (18); and wherein the weakening lines (20) are delimited by the adhesive strip (22) in a curved transition region (27) between short side legs (25, 26) and the long leg (24).

18. A cuboid paper tissue soft pack with an outer wrapper, comprising:

a tear open flap (18, 38, 42) which is defined in the outer wrapper by first weakening lines (20, 36, 44);

an adhesive strip (22, 39, 43) which is disposed on the outer wrapper, which at least partially covers the tear-open flap and the weakening lines, which partially projects beyond the tear-open flap, and by means of which the tear-open flap is movable between an open and a closed position, the adhesive strip and the tear-open flap being connected to one another, wherein the weakening lines (20, 36, 44) have opposite ends regions which are not covered by the adhesive strip; and reinforcement means (25, 26, 40), which are respectively located adjacent opposite free ends (21, 37) of said end regions of the weakening lines, for forming local reinforcements which locally increase the tearing resistance of the wrapper;

wherein the reinforcements have a cured shape and are arranged transverse to the end regions (37) of the weakening lines (36) and delimit said weakening lines (36).

19. A cuboid paper tissue soft pack with an outer wrapper, comprising:

a tear-open flap (18, 38, 42) which is defined in the outer wrapper by first weakening lines (20, 36, 44);

an adhesive strip (22, 39, 43) which is disposed on the outer wrapper, which at least partially covers the tear-open flap and the weakening lines, which partially projects beyond the tear-open flap, and by means of which the tear-open flap is movable between an open and a closed position, the adhesive strip and the tear-open flap being connected to one another, wherein the weakening lines (20, 36, 44) have opposite ends regions which are not covered by the adhesive strip; and reinforcement means (25, 26, 40), which are respectively located adjacent opposite free ends (21, 37) of said end regions of the weakening lines, for forming local reinforcements which locally increase the tearing resistance of the wrapper;

wherein the tear-open flap (18, 38) is formed in the region of a narrow end panel (16) of the pack (10); and wherein the tear-open flap (18, 38) continues from the end panel (16) into a wider front panel (11) which adjoins the end panel, and wherein reinforcements (25, 26; 40) which locally increase the tearing resistance of the wrapper are located in the front panel.

20. A cuboid paper tissue soft pack with an outer wrapper, comprising:

a tear open flap (18, 38, 42) which is defined in the outer wrapper by first weakening lines (20, 36, 44);

an adhesive strip (22, 39, 43) which is disposed on the outer wrapper, which at least partially covers the tear-open flap and the weakening lines, which partially projects beyond the tear-open flap, and by means of which the tear-open flap is movable between an open and a closed position, the adhesive strip and the tear-open flap being connected to one another, wherein the weakening lines (20, 36, 44) have opposite ends regions which are not covered by the adhesive strip; and reinforcement means (25, 26, 40), which are respectively located adjacent opposite free ends (21, 37) of said end regions of the weakening lines, for forming local reinforcements which locally increase the tearing resistance of the wrapper;

wherein said local reinforcements (25, 26, 40) are formed by edges of the adhesive strip (22, 39, 43) that are adjacent the free ends (21, 37) of the weakening lines (20, 36, 44).

* * * * *